United States Patent [19]

Bruckler et al.

[11] Patent Number: 4,490,039
[45] Date of Patent: Dec. 25, 1984

[54] WAVE FRONT SENSOR

[75] Inventors: Joseph M. Bruckler, Titusville;
James A. Gordon, III, Jupiter;
Stanley J. Scalise, West Palm Beach, all of Fla.

[73] Assignee: United Technologies Corporation, Hartford, Conn.

[21] Appl. No.: 478,616

[22] Filed: Mar. 25, 1983

Related U.S. Application Data

[63] Continuation of Ser. No. 215,904, Dec. 12, 1980, abandoned.

[51] Int. Cl.³ .............................................. G01J 1/20
[52] U.S. Cl. ...................................... 356/121; 250/201
[58] Field of Search ................. 356/121; 250/201, 202

[56] References Cited

U.S. PATENT DOCUMENTS 4,141,652  2/1979  Feinleib .............................. 356/121
4,198,164  4/1980  Cantor ................................ 250/202
4,309,602  1/1982  Gonsalves et al. ................ 250/201
4,320,462  3/1982  Lund et al. ......................... 356/73

OTHER PUBLICATIONS

Schmutz et al. "Integrated Imaging Irradiance Sensor", SPIE vol. 179, Adaptive Optical Components II (Apr. 19-20, 1979), pp. 76-80.

Primary Examiner—R. A. Rosenberger
Attorney, Agent, or Firm—Eric W. Petraske

[57] ABSTRACT

An improved wave front sensor for analyzing, measuring and controlling optical wave fronts incorporates detectors having a large number of photosensitive elements smaller than the beam spot size so that source and reference beam spot centers may be more accurately located and greater alignment errors may be tolerated. A reference beam may be switched on intermittently, thereby improving signal-to-noise ratio.

5 Claims, 2 Drawing Figures

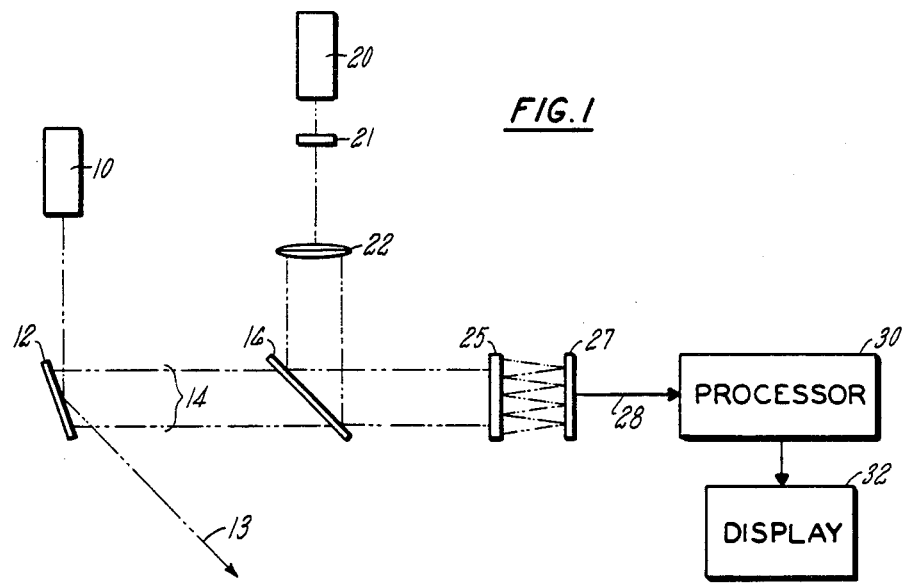
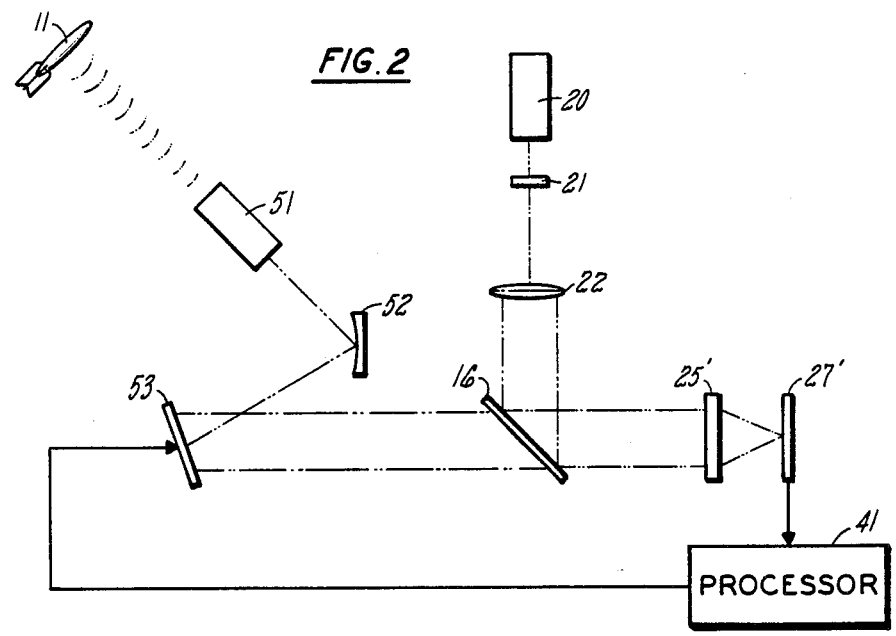

WAVE FRONT SENSOR

CROSS REFERENCE TO RELATED APPLICATIONS

This is a continuation of application Ser. No. 215,904, filed Dec. 12, 1980, now abandoned.

DESCRIPTION

1. Technical Field

The technical field of the invention is the measurement and analysis of optical wave fronts, for use in controlling laser output tracking targets, image enhancement and the like.

2. Background Art

In the field of optical wave front analysis, Hartmann sensors have been used, in which the wave front is divided into a suitable number of sub-fronts that are focused onto a set of quadrant optical detectors. Each quadrant detector produces four output signals that may be processed to give the position of the beam spot from the corresponding sub-front with respect to the detector. The position information from the several detectors may then be processed to provide a measurement of aberration in the full wave front, such as tilt, defocus, and higher order aberrations. Systems using such wave front analyzers are known for the purpose of analyzing and/or modifying a laser wave front, tracking a target by analyzing the target image to keep it centered in the field of view, or improving an image by controlling an active optical element to compensate for aberrations in the wave front entering the system.

A chronic problem with Hartmann sensors has been aligning the wave front divider with the detector array. If the beam spot on a quadrant detector is misaligned by more than one spot radius so that it lies entirely within one quadrant of a quadrant detector, that detector will be practically useless for position information. U.S. Pat. No. 4,141,652 discloses the use of a conical scan, or nutation, about the origin of the quadrant detector to avoid this problem. Nutated Hartmann sensors, however, are plagued by restrictive clear aperture dimensions, mechanical failure and high electrical power consumption.

DISCLOSURE OF INVENTION

The invention relates to an improved wave front analysis system, in which a matrix or array of detectors, each comprising a focal plane array of at least five photosensitive elements, produces position information for a source beam and for a reference beam that periodically illuminates the detector array.

According to one feature of the invention, the intermittent reference beam intensity is set at a level substantially exceeding the maximum expected source beam intensity and a detector intensity threshold, variable over the full dynamic range of the detectors, is used to separate electronically the source and reference beams. When the reference beam is turned on, the threshold is set to a value such that signals from the source beam are rejected; when the reference beam is off, the threshold is lowered to permit the detection of the source beam.

According to another feature of the invention, a detector array can be used for more than one sub-front of the wave front, by directing two or more sub-fronts onto a single detector array and electronically dividing the detector array into segments corresponding to each sub-front, thus reducing the number of arrays required.

BRIEF DESCRIPTION OF DRAWINGS

FIG. 1 illustrates an embodiment of the invention for analyzing the output of a laser.

FIG. 2 illustrates an embodiment of the invention for enhancing an image.

BEST MODE FOR CARRYING OUT THE INVENTION

In FIG. 1, laser 10 generates an output beam that is reflected by mirror 12 along beam path 13 and sampled by a grating in the mirror surface to send a low-power sample beam along path 14. Laser 20 generates a reference beam that passes through optical switch 21, which may be an acousto-optical diffraction grating that deflects the beam from laser 20 out of the beam path, an electro-optic modulator in combination with a polarizer-analyzer pair, a mechanical shutter or any other means of turning the beam on and off. The reference beam is collimated by lens 22 and combined collinearly with the source beam in beamsplitter 16. The two combined beams pass through wave front divider 25, illustratively an array of lenses, that divides the wave front into an array of sub-fronts and focuses them onto detector array 27. Detector array 27 is illustratively an N×N array of self-scanned detectors, each of which is in an M×M array of closely-spaced pixels, or individual photosensitive elements. A suitable detector is available from E.G.&G. Reticon, Sunnyvale, Calif., and comprises a one-eighth inch square array of 1,024 pixels, together with associated logic to integrate the electrical output of each pixel, digitize the individual results, assemble the digitized outputs into a conventional format and read them out on command and reset the device.

In operation, the reference beam is turned on, the detectors respond to the radiation falling on them, the output is transmitted over cable 28 and processed in processor 30, in the course of which those pixels having an output of less than a certain threshold are ignored, so that the effect of the source beam and background is removed (the reference beam may easily be made more intense than the source beam and/or an optical switch may be placed to control the source beam). The centroid of each spot from each sub-front of the reference beam is then computed, using some convenient algorithm such as $$(X,Y) = \frac{\sum_{i=1}^{L} P_i \cdot (x_i, y_i)}{\sum_{i=1}^{L} P_i}$$

where $x_i, y_i$ are fixed parameters representing the ith pixel, $P_i$ is the integrated response of the ith pixel, L is the number of pixels and X and Y are normalized coordinates of the spot centroid. The reference beam is then turned off and the source beam sub-front centroids are computed, either with no threshold or a lower one that rejects noise. For each sub-front, the quantity $\Delta_i$, the distance between reference and source beam centroids, is then computed. The N×N array of $\Delta_i$'s contains the information about the differences in the source beam and reference beam wave fronts; for a perfect match, each $\Delta_i$ will be zero. In the illustrative embodiment, the reference beam has been described as being collimated, with a planar wave front, but it may have any suitable shape representing the desired wave front of the source beam.

An advantageous feature of the use of a detector substantially greater than the beam spot size composed of pixels less than the beam spot size is that the beam and reference spots for a given sub-front may be centered on different pixels, the processing algorithm being modified to include a coordinate transfer in the computation of $\Delta_i$. In contrast, the prior art Hartmann sensors with their relatively coarse detectors required that the beam and reference spots be separated by less than one beam spot diameter, or else the spot positions could not be located with sufficient precision. This restriction effectively limited the magnitude of $\Delta_i$ that could be handled by the system and thus not only imposed stringent alignment conditions, but also limited the degree of source beam aberration that could be effectively measured or controlled.

The $\Delta$ array is then processed to compute the difference between the reference and source beams. The results of the processing are illustratively displayed in unit 32, which may be a cathode ray tube displaying the reconstructed source beam wave front. Alternatively, processor 30 may generate control signals to adaptive optics in laser 10 so that the quality of the output beam may be adjusted in real time. Systems for generating adaptive optics control signals in response to the output of a Hartmann sensor are well known to those skilled in the art and are not part of the subject invention, which is concerned with an improved Hartmann sensor.

In FIG. 2, an alternative embodiment of the invention is illustrated, in which a system constructed according to the invention is used to track an object and also to enhance the image. In this example, an object 11, such as a rocket, is being tracked by telescope 51, which is capable of moving its field of view to track an object. A source beam from telescope 51 is collimated by mirror 52 and the collimated beam is reflected by deformable mirror 53. The source beam is combined with a reference beam as in the embodiment of FIG. 1. In an embodiment that is used solely for tracking a target, wave front divider 25' need have only one lens and detector array 27' need have only one detector. If the device is used for image enhancement, then several lenses and detectors will be used.

For tracking, the processing is relatively simple—telescope 51 is controlled by processor 41 so that the deviation between the source and reference beam centroids is kept to a minimum. For this purpose, the large size of the detector array and the small size of the pixels relative to the beam spot are advantageous, since they permit more accurate position location than was possible in the prior art. If the system is to be used for image enhancement, then processor 41 also controls deformable mirror 53 to compensate for distortions in the source wave front caused by atmospheric turbulence or tracking error.

An additional feature of the invention is that more than one sub-front of the wave front may be focused on a detector array, so that the number of detectors is correspondingly reduced. In this case, the lenses are tilted appropriately so that several sub-fronts focus on a single detector array. The processing procedure is suitably modified in a manner evident to those skilled in the art to compensate for the changed relationship between the wave fronts and the $\Delta$ array of centroid distances.

The time duration the reference beam is present may be adjusted as required. Typically, the reference beam will be on for a small fraction of the time, since it will be a relatively intense beam that will give detector signals of reasonable magnitude in a relatively short period. Advantageously, this permits the system to accept radiation from the source for a relatively long time, thus providing a better signal-to-noise ratio. Further, the fact that the reference beam is not continuously present means that detection of the source beam can occur without "noise" introduced from the reference beam and with an improved optical dynamic range.

We claim:

1. An apparatus responsive to optical wave fronts comprising:
   (a) switchable means for producing a reference beam of optical radiation for predetermined duration at a predetermined time and at a predetermined power level;
   (b) means for combining said reference beam collinearly along a predetermined optical path with an input source beam of optical radiation;
   (c) wave front dividing means disposed along said optical path having a plurality of apertures for dividing optical radiation traveling along said optical path into a plurality of corresponding source and reference sub-beams passing through the same aperture and for focusing said sub-beams into a plurality of corresponding source beam spots and reference beam spots, each having a predetermined spot area;
   (d) optical detector means disposed to intercept said beam spots and responsive to said optical radiation, for detecting the position of said beam spots thereon, which detector means comprise at least one two-dimensional optical detector array having an array area substantially greater than said spot area, said detector array further comprising at least five contiguous photosensitive elements producing element output signals responsive to optical radiation and having an element area less than said spot area; and
   (e) electronic means responsive to said element output signals for computing the distance between each of said reference beam spots and the corresponding source beam spot, which electronic means includes discriminator means having a first threshold set to reject element output signals generated by noise in said photosensitive elements, and in which apparatus said predetermined duration and said predetermined time are such that said reference beam impinges on said optical detector means with a duty cycle considerably less than a corresponding duty cycle of said input beam, whereby said input beam is detected with an advantageous signal-to-noise ratio;
   in which apparatus said switchable means, said means for combining said reference beam collinearly, said wave front dividing means and said optical detector means have predetermined spatial relationships with each other and with said optical path that are constant in time, whereby time-varying mechanical motion does not occur in said apparatus.

2. An apparatus according to claim 1, in which said wave front dividing means further includes means for deflecting as well as focusing radiation, so that at least one of said at least one two-dimensional optical detector arrays is responsive to at least two of said reference beam spots and at least two of said source beam spots.

3. An apparatus according to claim 1, in which said discriminator means further includes a second threshold set to reject the maximum element output signal produced by said input source beam, so that input beam signals are recognized as being those received while said reference beam is switched off that are in excess of said first threshold;

in which apparatus, said reference beam is switched on with said predetermined power level, which power level has a magnitude such that at least three of said element output signals exceed said second threshold, so that said reference beam spot produces signals that are distinguished from signals responsive to said input source beam by being in excess of said second threshold, whereby said reference beam spot is distinguished from a simultaneously present input source beam spot.

4. An apparatus according to claim 1, further including optical shutter means for blocking said input source beam from said predetermined optical path, said optical shutter means coacting with said switchable means to direct said reference beam and said source beam alternatively on said optical detector means.

5. An apparatus responsive to optical wave fronts comprising:
 (a) switchable means for producing a reference beam of optical radiation for a predetermined duration at a predetermined time and at a predetermined power level;
 (b) means for combining said reference beam collinearly along a predetermined optical path with an input source beam of optical radiation;
 (c) wave front dividing means disposed along said optical path having a plurality of apertures for dividing optical radiation traveling along said optical path into a plurality of corresponding source and reference sub-beams passing through the same aperture and for focusing said sub-beams into a plurality of corresponding source beam spots and reference beam spots, each having a predetermined spot area;
 (d) optical detector means disposed to intercept said beam spots and responsive to said optical radiation, for detecting the position of said beam spots thereon, which detector means comprise at least one two-dimensional optical detector array having an array area substantially greater than said spot area, said detector array further comprising at least five contiguous photosensitive elements producing element output signals responsive to optical radiation and having an element area less than said spot area; and
 (e) electronic means responsive to said element output signals for computing the distance between each of said reference beam spots and the corresponding source beam spot, which electronic means includes discriminator means having a first threshold set to reject element output signals generated by noise in said photosensitive elements, and in which apparatus said predetermined duration and said predetermined time are such that said reference beam impinges on said optical detector means with a duty cycle considerably less than a corresponding duty cycle of said input beam, whereby said input beam is detected with an advantageous signal-to-noise ratio;

in which said wave front dividing means further includes means for deflecting as well as focusing radiation, so that at least one of said at least one two-dimensional detector arrays is responsive to at least two of said reference beam spots and at least two of said source beam spots.

* * * * *